Sept. 19, 1961 W. L. JAYNES, JR 3,000,558

PRESSURE COMPUTERS

Filed Sept. 16, 1955 5 Sheets-Sheet 1

INVENTOR.
WILLIAM L. JAYNES, JR.
BY F. P. Keiper
ATTORNEY

INVENTOR.
WILLIAM L. JAYNES, JR.
BY F. P. Keiper
ATTORNEY

PRESSURE COMPUTERS

Filed Sept. 16, 1955 5 Sheets-Sheet 3

INVENTOR.
WILLIAM L. JAYNES, JR.
BY [signature]
ATTORNEY

Sept. 19, 1961 W. L. JAYNES, JR 3,000,558

PRESSURE COMPUTERS

Filed Sept. 16, 1955 5 Sheets-Sheet 4

INVENTOR.
WILLIAM L. JAYNES, JR.
BY

ATTORNEY

Sept. 19, 1961 W. L. JAYNES, JR 3,000,558

PRESSURE COMPUTERS

Filed Sept. 16, 1955 5 Sheets-Sheet 5

INVENTOR.
WILLIAM L. JAYNES, JR.
BY

ATTORNEY

United States Patent Office 3,000,558
Patented Sept. 19, 1961

3,000,558
PRESSURE COMPUTERS
William L. Jaynes, Jr., Onondaga, N.Y. (107 Lindbergh Road, Syracuse, N.Y.), assignor of one-half to Arthur R. Jaynes, Syracuse, N.Y.
Filed Sept. 16, 1955, Ser. No. 534,789
2 Claims. (Cl. 235—86)

This invention relates to pressure computers, and more particularly to a device for use in the laying of fire hose, the disposition of pumpers in connection therewith and the computing of pumper pressures to be applied to such hose.

Fire hose, adapted to handle large volumes of water at heavy nozzle pressures is subject to limitations. New hose has a higher safe pressure limit from that which has been in use. Canvas composition hose which is stored in folded position on a fire truck is subject to deterioration and the development of weak spots and pressures applied to such hose and developed at the nozzle must be held within safe limits. When such hose is employed in extended lengths during a fire emergency, it is essential that the pressures applied to the hose, and the location of pumps along the length thereof be determined with due regard to the strength of the hose, the friction losses within the hose, the nozzle tip diameter, the nozzle pressure required and other factors. It is most important that such determinations be made quickly and correctly, to avoid bursting of hose, and to provide safety to the fire fighting force, as well as to provide maximum efficiency and effectiveness in the use of the available equipment.

The present invention is directed to a computer or calculator adapted to be quickly manipulated in accordance with factors which become known upon the arrival at a fire location, whereby the laying of hose, and the positioning of pumpers along the length of hose, and the safe and efficient operating pressures can be immediately determined and placed in effect.

The invention, more particularly, has to do with the provision of a calculator or computer which when manually set to a hose length and hose diameter, or a nozzle tip diameter and hose diameter and length will immediately show the pressures which can be properly applied to a hose by pumping equipment as well as the proper location of such equipment. The calculator also assists in determining the proper pumper pressures for multiple hose lines employed to supply a single heavy turret nozzle or other similar appliance.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
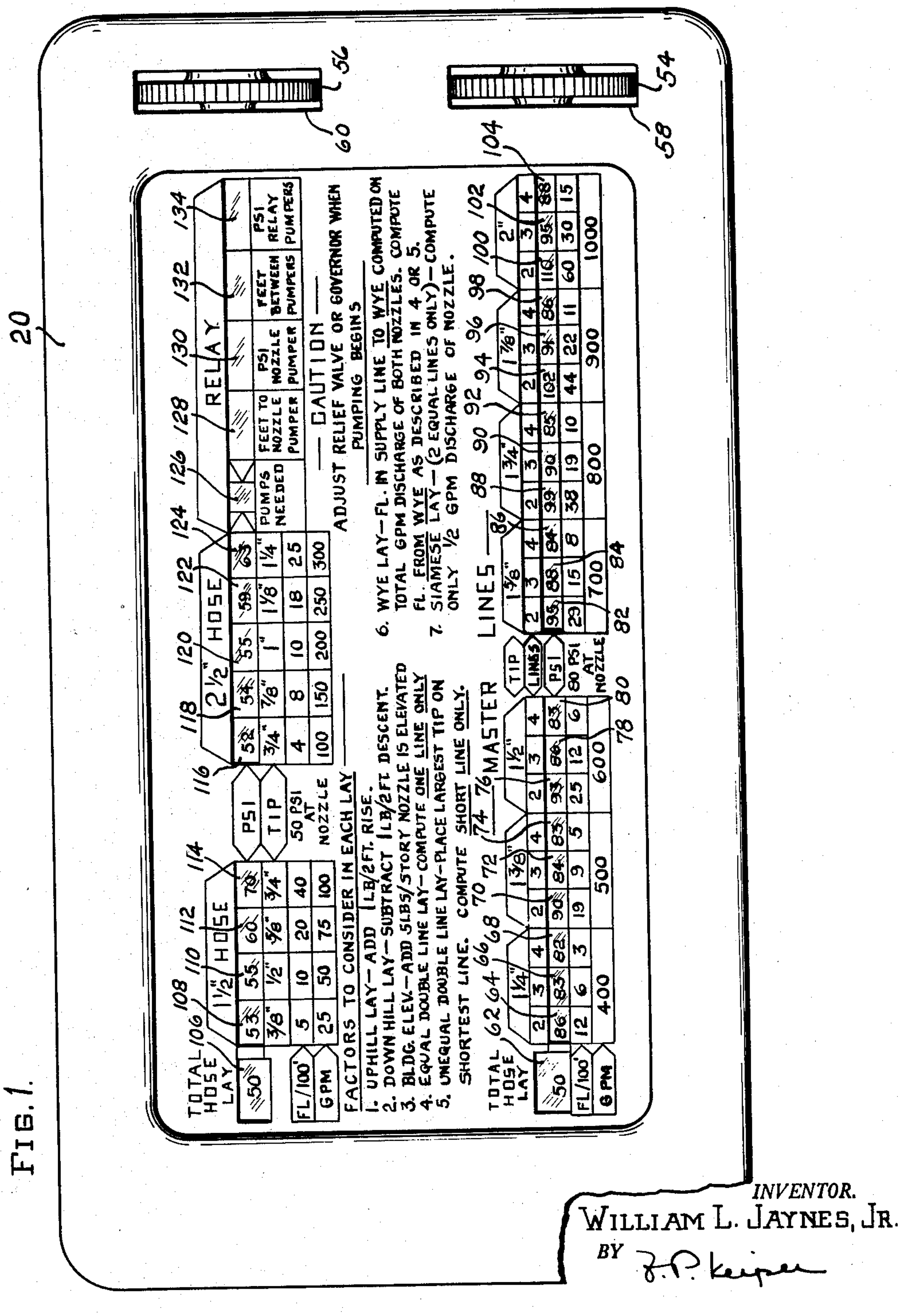
FIGURE 1 is a plan view of one form of the computer.
Figures 2, 3:
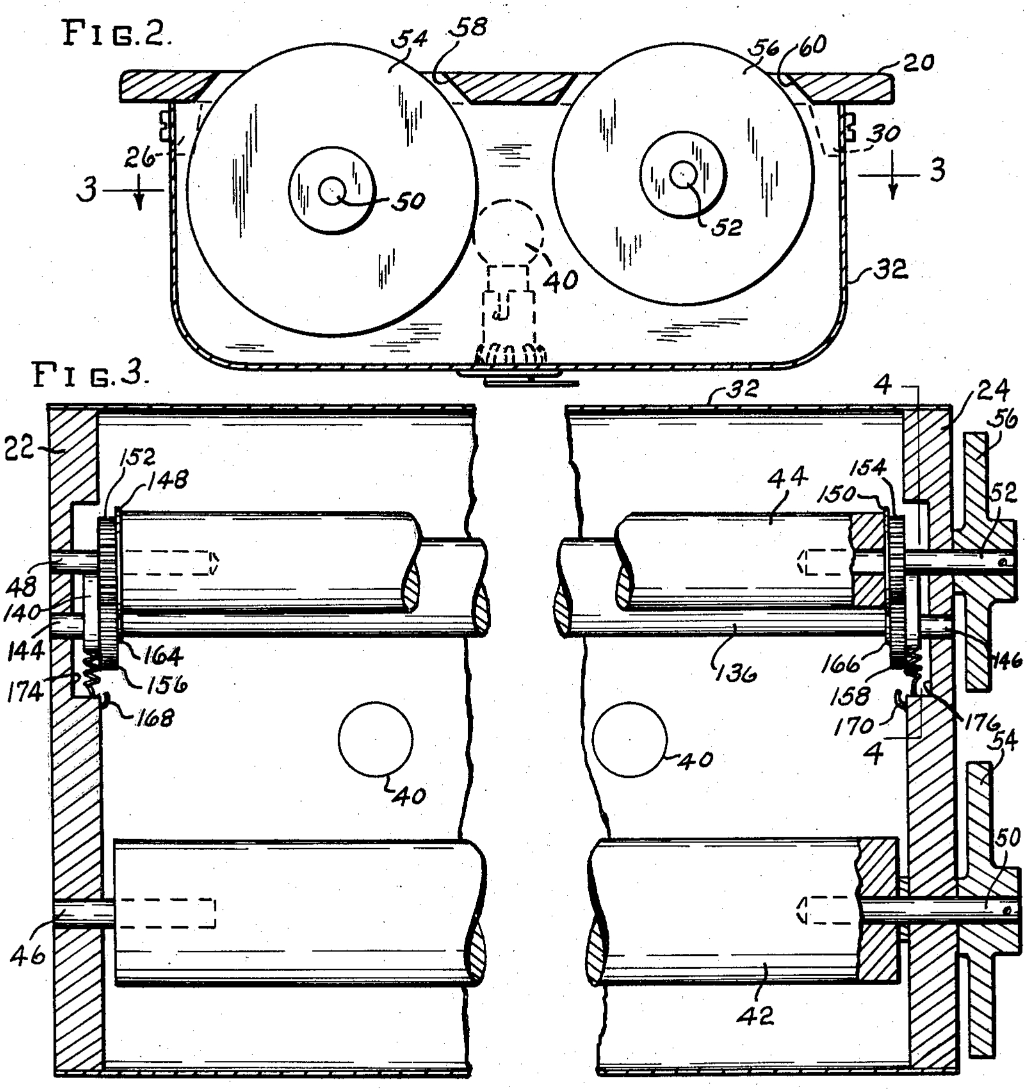
FIGURE 2 is an end elevational view of the computer, with parts shown in section.
FIGURE 3 is a longitudinal sectional view through the computer taken substantially on the line 3—3 of FIGURE 2.
Figure 4:
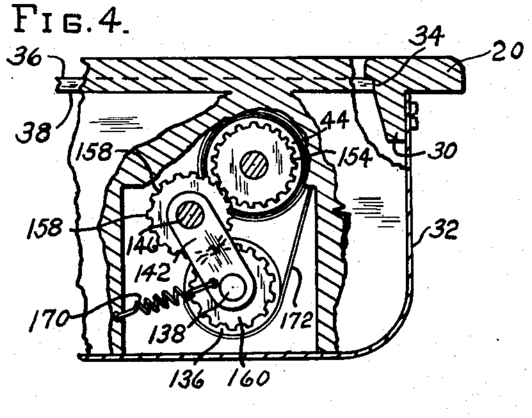
FIGURE 4 is a fragmentary sectional view taken substantially on the line 4—4 of FIGURE 3.

Referring to the drawings, and more particularly to FIGURES 1–4, there is shown a panel frame 20 having integral rearward extending end walls 22 and 24 and longitudinally extending integral ribs 26 and 30, over which a casing shell 32 is placed. The panel frame is provided with a rectangular rabbet 34 on the under side thereof, into which is set a transparent panel 36, on the rear face of which is secured a translucent card 38 on which appears various legendary matter. Such panel 36 may be of glass or clear plastic sheet. Within the casing are positioned one or more panel and card illuminating lights 40, and a pair of spaced rolls 42 and 44, the cylindrical surfaces of which are arranged close to and substantially tangential with the inner surface of the panel 36 and particularly the panel card 38. The panel and casing are adapted to be mounted on a fire truck, where ready reference can be had.

The rolls 42 and 44 have stub shafts 46 and 48 at one end journalled in the end wall 22, and longer stub shafts 50 and 52 at their other end which project through the end wall 24, and are fitted with knurled wheels 54 and 56, which project through slots 58 and 60 in the panel frame so as to be accessible from the front for manual operation.

The panel card 38 is provided with a series of windows 62, 64, 66, 68, 70, 72, 74, 76, 78, 80, 82, 84, 86, 88, 90, 92, 94, 96, 98, 100, 102 and 104 arranged so as to cooperate with the adjacent tangential portion of the roll 42. The panel card is also provided with a second series of windows 106, 108, 110, 112, 114, 116, 118, 120, 122, 124, 126, 128, 130, 132 and 134, arranged so as to cooperate with the adjacent tangential portion of the roll 44.

Figure 6:
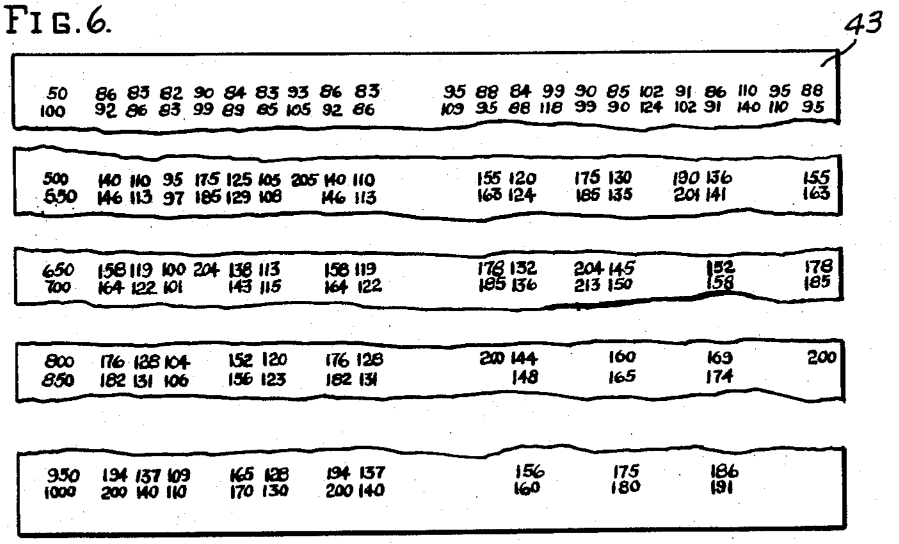
FIGURE 6 is a plan view with parts cut away of the chart applied to the other of the rolls.
Figures 7, 10:
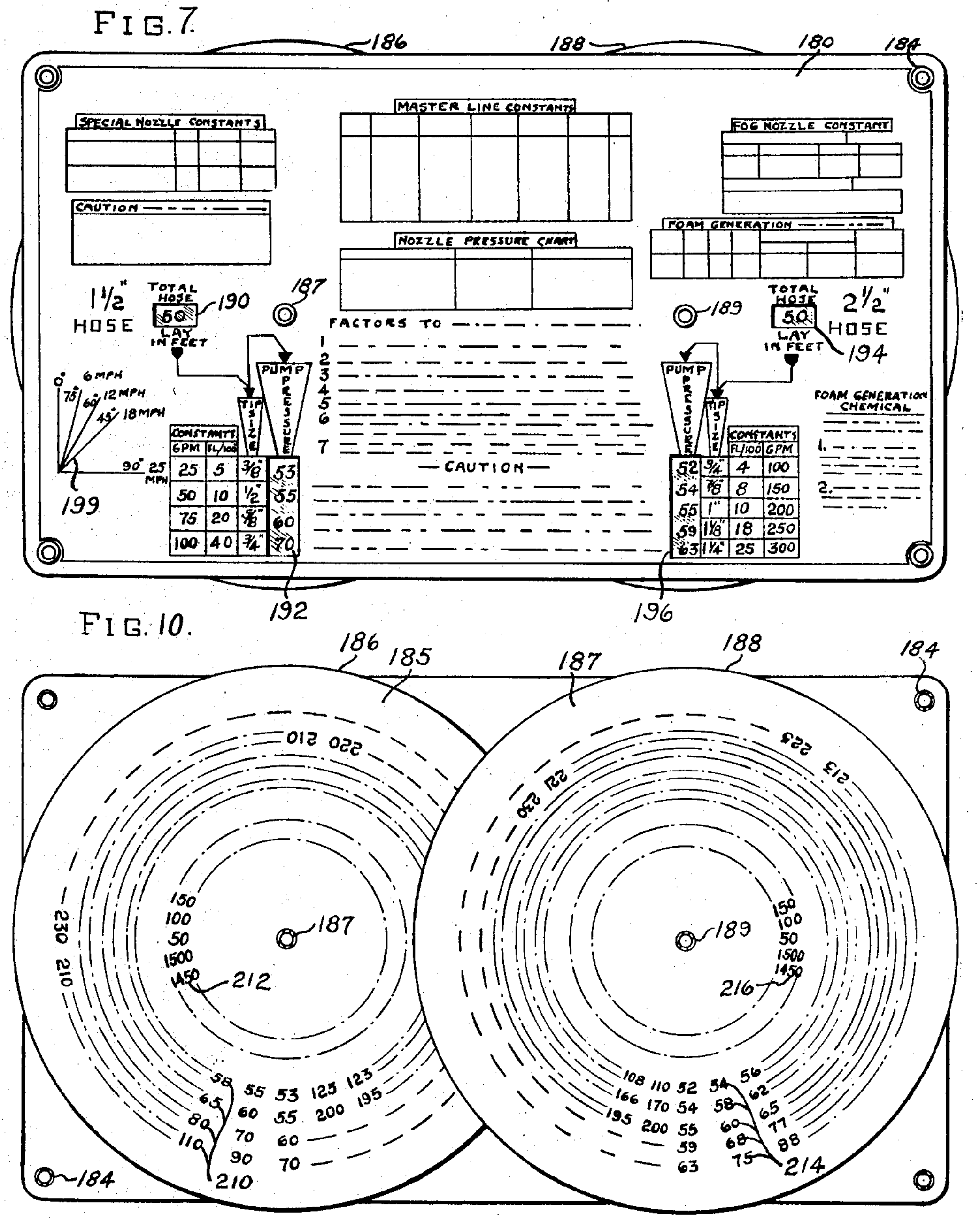
FIGURE 7 is an elevational view of one side of a modified form of the computer.
FIGURE 10 is an elevational view of one side of the computer discs, the face shown in FIGURE 7, being removed.
Figure 8:
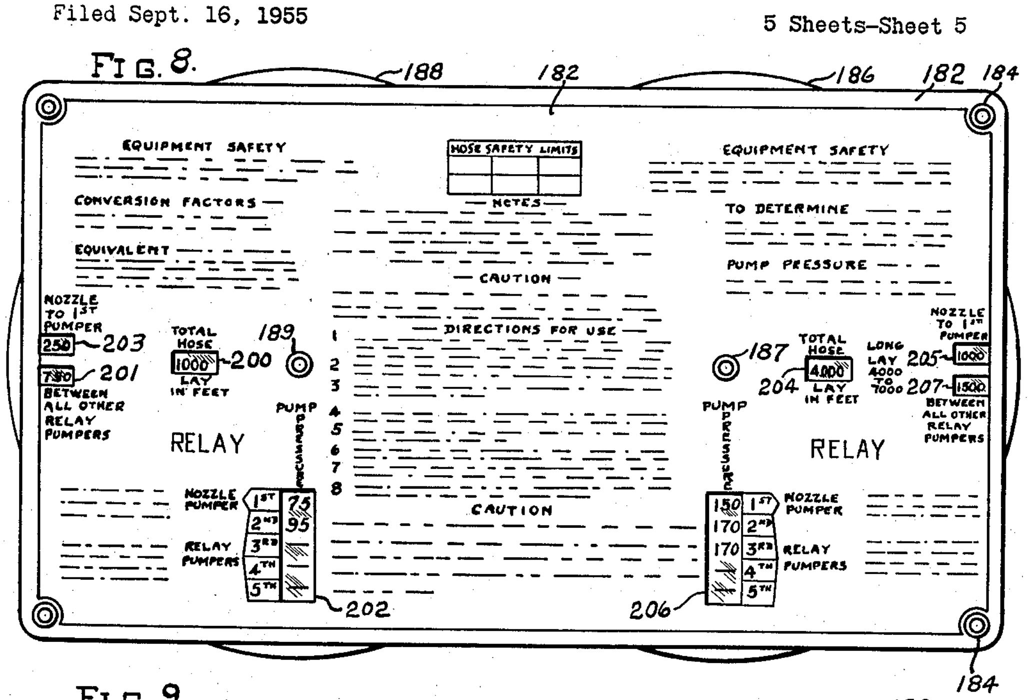
FIGURE 8 is an elevational view of the other side of the modified computer.
Figures 9, 11:
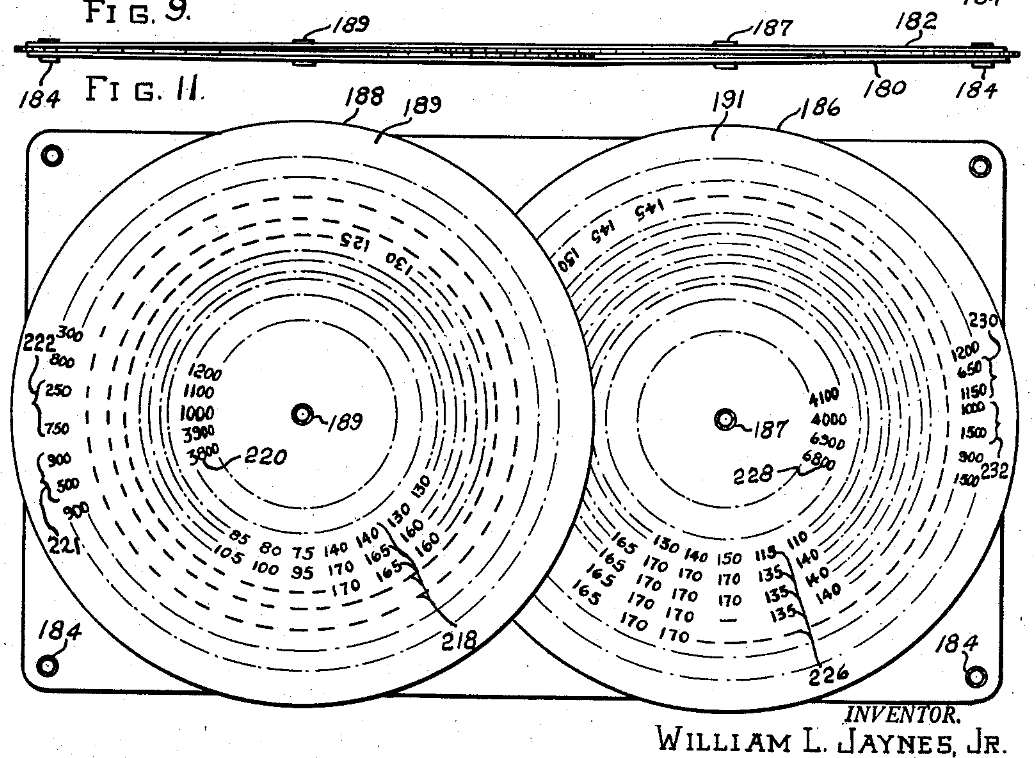
FIGURE 9 is an edge view of the modified computer.
FIGURE 11 is an elevational view of the other side of the computer discs, the face shown in FIGURE 8 being removed.

The roll 42 is provided with a chart 43 arranged around its cylindrical periphery, such chart being laid out as is indicated in FIGURE 6, there being a series of numbers arranged in columns or rows, and lines, the latter to align with the windows 62–104, inclusive. Each line of figures of such chart provides information in regard to pressure useful to the fire squad in respect to the length of hose being used where two or more hose are used to feed a single appliance. In practice a separate line of figures are provided for each 50 feet, since fire hose is provided in standard lengths of 50 feet. Such figures are arranged in vertical columns or rows to correspond to the spacing between the windows 62–104 inclusive. It will be seen that 20 lines of figures will be required to provide complete pressure information in respect to hose lays up to 1,000 feet, where the sections are 50 feet in length.

The roll 44 is provided with a chart 45 which is longer than the periphery of the roll, since it is desired to provide information respecting a hose lay up to 7,000 feet, in 50-foot sections, which requires 140 lines of figures. To accommodate such a chart, the roll 44 is made of smaller diameter, and an auxiliary roll 136 is provided. The roll 136 has stub shafts as at 138 in either end which are journalled in short links 140 and 142, which links are pivoted upon the casing end walls on short stub shafts 144 and 146. The ends of roll 44 are provided with flange discs 148 and 150, and gears 152 and 154. The latter mesh with gears 156 and 158 freely pivoted on the stub shafts 144 and 146. Gears 156 and 158 in turn mesh with gears such as 160 on the ends of roll 136, which latter roll is also provided with flange discs 164 and 166. Assuming rolls 44 and 136 are of the same diameter, the gears 152 and 154, and gears 160 will be of the same diameter, while the idler gears 156 and 158 can be of any convenient diameter. The chart 45 is attached at one end to roll 44, and at the other end, to roll 136. Springs 168 and 170 tension the links so that the reach 172 of the chart 45 between rolls is always held taut. While the chart is of thin flexible material, the spiral lays or convolutions on one roll or the other will affect a change in effective diameters of the rolls as the chart is rolled from one drum to the other, and the pivoted links 140 and 142 provide a take up for the slack in the reach 172 that might otherwise be created. The flange discs 148 and 150, and 164 and 160 may serve to hold the idler gears on their respective stub shafts. The links 140 and 142 are located in recesses 174 and 176 arranged in the end walls. While gearing is shown at both ends for balanced operation, a single set of gears at one end may suffice.

In the modifications shown in FIGURES 7–11, two plastic sheets 180 and 182 secured together at the corners with rivets 184, are provided with discs 186 and 188 interposed therebetween, the discs being pivoted as at 187 and 189. The sheet 180 is provided with windows 190 and 192 to cooperate with indicia arranged in radially disposed lines and in rows arranged on concentric circles, on one side 185 of disc 186, and windows 194 and 196 cooperate with indicia similarly arranged on one side 187 of disc 188 (see FIGURES 7 and 10). The sheet 182 is provided with windows 200, 202, 201 and 203 cooperating with the reverse side 189 of disc 188, and with windows 204, 206, 205 and 207 cooperating with the reverse side 191 of disc 186 (see FIGURES 8 and 11). The discs are of a diameter slightly greater than the width of the sheets so that the edges project to permit ready rotation of the discs manually.

The plastic sheets may be imprinted with black letters, on a white background, and the white background eliminated to expose the clear plastic to form the windows. The sheet 180 may have imprinted thereon a convenient smoke angle wind velocity indicator as at 199, and other pertinent information as desired.

The side 185 of disc 186 will be provided with four concentric rows 210 of indicia readable through window 192, and a row 212 of figures readable through window 190, the latter figures progressing in multiples of 50 feet to indicate the length of a lay of 1½″ hose, and the concentric rows indicating the corresponding pump pressures necessary for various nozzle tip sizes for a corresponding specified delivery of gallons per minute. The friction loss per 100′ of hose as well as the gallons per minute is also indicated for the corresponding tip size.

It will be observed that the highest pressure indicated is 230#, no figures being given above such value, since the safe strength of the 1½″ hose would be exceeded.

The side 187 is provided with five concentric rows 214 of pressure data respecting 2½″ hose cooperating with window 196 and a row 216 of hose lengths in 50′ increments which cooperate with window 194.

The side 189 of disc 188 will have five concentric rows of pressure data as at 218, a row of hose lengths in feet in 100 foot increments as at 220 cooperating with window 200, and pairs of numbers such as 222 and 221 which cooperate with windows 203 and 201, to indicate the preferred distances between the nozzle pumper and nozzle and the distance between the relay pumpers and nozzle pumper.

The side 191 of disc 186 will have five concentric rows of pressure data 226 cooperating with window 206, and a row of hose lay lengths 228 varying in 100′ increments cooperating with window 204, and pairs of numbers such as 230 and 232 which cooperate with windows 205 and 207 to indicate distances between the nozzle pumper and nozzle, and the distances between relay pumpers and nozzle pumper.

Referring to the modification of FIGURES 1–6 inclusive, it will be seen that the chart windows are adapted to show for a specific length of hose the various pressures required for various nozzle tip sizes, where a pressure of 50#/sq. in. is desired at the nozzle. Under the heading "1½″ Hose" it will appear that for a ⅝″ nozzle tip, and 50′ of hose, a pumper pressure of 53#/sq. in. is required. If a ¾″ tip is to be used, 70# pressure is required. Beneath the tip sizes are indicated the friction loss in pounds per square inch per 100 feet of hose, and immediately below is shown the gallons per minute delivered by the corresponding nozzle size with 50# pressure at the nozzle tip. Wherever pressures are referred to herein, pressures in pounds per square inch are intended.

Under the heading "2½″ Hose" is shown the corresponding pressures required for the nozzle tip diameters indicated together with the friction losses per 100 feet of hose and the gallons per minute delivered by the nozzle, all being determined in respect to a 50# nozzle pressure.

Under the heading "Relay" will appear the number of pumpers or "pumps needed" and the distance between relay pumpers and the nozzle pumper "Feet between pumpers," as well as the output pressures required at such pumpers, and also the distance between nozzle and nozzle pumper "Feet to nozzle pumper," and the output pressure required to provide a nozzle pressure of 50# for a 1″ nozzle or a 200 gallon per minute discharge. It will be appreciated that in long lays of hose it is necessary to provide not only a pumper to provide the proper nozzle pressure, but also relay pumpers along the line to supply the nozzle pumper. The maximum safe working pressure for 2½″ hose preferably does not exceed 200#/sq. inch. It will appear from the chart of FIGURE 5 under "2½″ Hose" that with a hose length of 1500 feet, and a 1″ nozzle or equivalent requiring 200 gallons per minute, that a pressure of 200# is required to supply 200 gallons at 50# pressure at the nozzle. The friction loss, at 200 gallons per minute in 2½″ hose is in round numbers 10# per 100 feet. Thus it will be seen that 150# pressure drop is incurred in 1500 feet of hose, leaving 50# pressure at the nozzle. The single pumper, which is a "nozzle pumper," thus must operate at an output pressure of 200#. This situation would be an extreme condition. Any length of hose of 1,000′ or more is preferably provided with a nozzle pumper, as well as one or more relay pumpers according to length. The function of a relay pumper is to deliver the quantity of water called for by the nozzle pumper and delivery at the nozzle pumper may be at a pressure as low as 20#. The relay pumper therefore will actually produce a greater differential pressure, that is the difference between intake pressure and output pressure than the nozzle pumper, and thus each relay pumper may handle a longer length of hose than the nozzle pumper. Each relay pumper serves, in effect, to bring the hydrant to the nozzle pumper.

Figure 5:
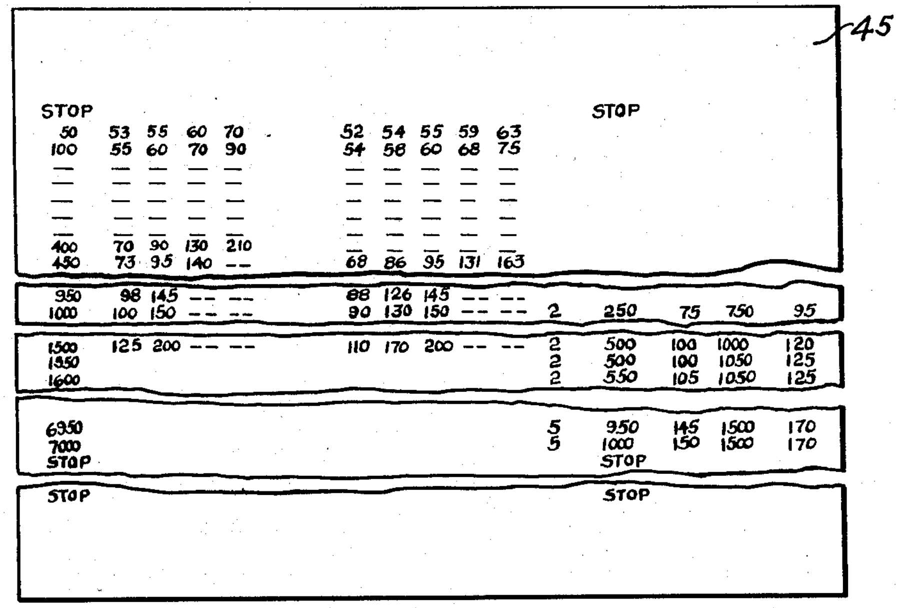
FIGURE 5 is a plan view with parts cut away of the chart applied to one of the rolls.

Referring to FIGURE 5, it will be seen that for a 1500′ hose length, it is recommended that 2 pumpers be employed, and that the nozzle pumper be located 500′ from the nozzle, and operate at 100# output pressure, which pressure will drop 50# along the length of the hose due to friction loss, providing 50# pressure remaining at the nozzle. The relay pumper will handle the 1,000′ of hose extending to the nozzle pumper, and operating at a pressure output of 120# will deliver 20# pressure at the nozzle pumper, 100# being the pressure drop along the 1,000 feet of hose due to friction loss.

Where, for example, 7,000′ of hose must be used, it will be seen that the nozzle pumper will be located 1,000′ from the nozzle and operate at 150# output pressure to provide a 50# pressure at the nozzle. At the same time the four relay pumpers will be spaced 1,500′ apart, and operate at 170# output pressure to compensate for a 150# pressure drop due to friction loss, and thus deliver its output to the succeeding pumper at about 20# pressure.

While typical figures are shown in FIGURE 5, it will be appreciated that values for hose lines covering the entire range from 50′ to 7,000′, in fifty foot increments are utilized on the chart, two pumpers being used up to 2,500′, the nozzle pumper supplying 1,000′ of the hose, while the relay pumper supplies 1,500′. Three pumpers would be used for lines up to 4,000′, four up to 5,500′ and five for lines up to 7,000′. In each case the nozzle pumper section of hose is about 500′ shorter than the relay pumper sections, to provide for adding hose to the nozzle end, and to provide for closer control between the nozzle and nozzle pumper, and for reserve pressure, as for example, should the nozzle be elevated, as is the case when operated from a ladder or on a roof top. If the nozzle be elevated 50 feet above the nozzle pumper, approximately 25# increase in output pressure will be required to maintain 50# nozzle pressure. Where a relay pump is on a different elevation from the succeeding pump, a suitable increase or decrease in pumper pressure is employed to compensate.

The chart of FIGURE 6, applied to roll 42 provides a ready means for quickly determining the correct pressures to be applied to multiple hose lines feeding a single master appliance such as a turret nozzle, whose nozzle diameters may range from 1¼″ to 2″. For example, if it is desired to supply a 2″ nozzle from a distance of 800 feet, 4 lines of 2½″ hose will be required, and each hose will require a 200# pumper pressure to produce an 80# pressure at the nozzle. If the same nozzle is to be fed by lines of different lengths, for example, 500′, 100′, 650′ and 700′, the pressures at the pumper ends of the hose lines will be 155#, 95#, 178# and 185# respectively. Under such conditions all four hose lines will deliver substantially like amounts to the master nozzle.

If a 1½″ nozzle is to be employed, and the hose lines are each 150′ in length, two lines will supply the nozzle at 80# if the pumper pressures are each 109#. If three lines are employed the pumper pressure should be 93# on each line, and if four lines can be used, the pumper pressures applied to each line need only be 88#. If the lines are of different lengths and there are three lines, for example, 150′, 200′ and 250′ in length, the pumper pressures will be 98#, 104# and 110# respectively to assure each line delivering approximately the same number of gallons as the others.

The modification of FIGURES 7–11 operates in a similar fashion. For example, in FIGURES 8 and 11, the disc face 189 carries pressures for hose lengths from 1,000′ to 3,900′ in 100′ increments, in the circular row 220, and corresponding pressures for nozzle and relay pumpers are arranged on the radial lines as at 218. For 1,000′, the pressures are 75# and 95# respectively for nozzle pumper and relay pumper, and the circular row 222 carries pairs of distance numbers to indicate the proper spacing between pumpers and pumper and nozzle, the spacing for 1,000′ being 750′ for relay, and 250′ for the nozzle pumper. Disc face 191 carries the range from 4,000′ to 7,000′; the radial lines of numbers 226 giving the pressure and the pairs of numbers 230 and 232 arranged circularly around the dial indicating the spacing. In each case the windows 200, 201, 202 and 203, and 204, 205, 206 and 207, cooperate with, the data which is so positioned on the discs, as to provide the correct information for each total length of hose placed in use.

The circular row of hose lengths 212 on dial face 185, and the radial lines of pressures coact with windows 190 and 192 to provide the same information as provided in FIGURES 1–5 in connection with nozzles ranging from ⅜″ to ¾″ as used in connection with 1½″ hose, while the information on the face of dial 187 provides the same information as that obtained from the form of FIGURES 1–5 in connection with 2½″ hose and nozzles ranging from ¾″ to 1¼″ nozzles. Wherever a nozzle size is referred to, it will of course be understood that equivalent groups of nozzles can be supplied. For example, two ¾″ nozzles each use 100 gallons per minute, or a total of 200 gallons per minute, and are therefore the approximate equivalent of a single 1″ nozzle.

While the various constants and relationships referred to are relatively correct, the constants are reduced to round numbers readily usable in the field. The friction loss of 10# per 100′ of 2½″ hose, for example, may vary according to whether the hose be new or old, and the gallonage from the various nozzles are close approximations. The factors involved are all sufficiently close to true values, whereby an effective and useful computer is provided, that is especially adapted to instant reference, so that a minimum of delay is incurred at getting the information desired, whereby a proper and efficient hose and pumper layout may be quickly set in operation.

While two forms of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A pump pressure computer for fire hose use comprising a casing having a card forming a wall thereof, a roll journalled within the casing on an axis parallel to the plane of said card, windows in said card arranged along a line parallel to the axis of the roll, a second roll journalled within said casing, means for mounting said second roll for movement towards and away from said first roll, yielding means for urging said rolls apart, a flexible chart having its ends secured to each of said rolls, and being adapted to be rolled from one roll to the other and pass beneath said window, said chart having a series of rows and lines of indicia thereon adapted to be viewed through said windows one line at a time, and means for driving one of said rolls from the other.

2. A pump pressure computer for use in connection with fire hose comprising a casing having end walls and a card forming a wall thereof, a first roll journalled within the casing on the end walls and on an axis parallel to the plane of said card, windows in said card arranged along a line parallel to the axis of the roll, a second roll arranged within said casing parallel to the first named roll, a pair of links pivotally mounted on the casing end walls at pivotal points spaced from the axis of the first roll and having bearings spaced from said pivotal points for mounting said second roll for movement towards and away from said first roll, yielding means acting on said links for urging said rolls apart, a flexible chart having its ends secured to each of said rolls, and being adapted to be rolled from one roll to the other, said chart having indicia thereon adapted to be viewed through said windows and means for driving one of said rolls from the other comprising a gear on one end of each roll, and an intermediate pinion meshing, with each of said gears and journalled on the axis of the pivotal point of one of said links.

References Cited in the file of this patent

UNITED STATES PATENTS

| | | |
|---|---|---|
| 634,779 | Tregoning | Oct. 10, 1899 |
| 778,790 | Merrill | Dec. 27, 1904 |
| 784,660 | Chritton | Mar. 14, 1905 |
| 896,002 | Free | Aug. 11, 1908 |
| 1,169,300 | Tilly | Jan. 25, 1916 |
| 1,863,684 | Cambridge | June 21, 1932 |
| 2,192,257 | Champion et al. | Mar. 5, 1940 |

OTHER REFERENCES

Pages 134–151 of "Fire Pumps and Hydraulics," by J. E. Potts and T. H. Harriss, published by the Chemical Publishing Company, Inc., of Brooklyn, N.Y., in 1943.

Pages 1290 to 1296 of "N.F.P.A. Handbook of Fire Protection," 10th edition 1948, 60 Batterymarch, Boston, Mass.